(12) United States Patent
Dubeck et al.

(10) Patent No.: US 7,693,620 B2
(45) Date of Patent: Apr. 6, 2010

(54) APPROACH GUIDANCE SYSTEM AND METHOD FOR AIRBORNE MOBILE PLATFORM

(75) Inventors: Scott T Dubeck, Philadelphia, PA (US); Kevin G Schurek, West Chester, PA (US)

(73) Assignee: The Boeing Company, Chicago, IL (US)

( * ) Notice: Subject to any disclaimer, the term of this patent is extended or adjusted under 35 U.S.C. 154(b) by 404 days.

(21) Appl. No.: 11/140,755

(22) Filed: May 31, 2005

(65) Prior Publication Data

US 2006/0271250 A1 Nov. 30, 2006

(51) Int. Cl.
*G06F 19/00* (2006.01)

(52) U.S. Cl. .......................................... 701/16; 701/3
(58) Field of Classification Search ............. 701/16; 244/187, 188, 189
See application file for complete search history.

(56) References Cited

U.S. PATENT DOCUMENTS

| | | | |
|---|---|---|---|
| 2,927,751 A | | 3/1960 | Daspit |
| 3,355,126 A * | | 11/1967 | Oppedahl .................... 244/189 |
| 3,786,505 A * | | 1/1974 | Rennie .......................... 342/33 |
| 3,944,171 A | | 3/1976 | Boone et al. |
| 3,976,267 A | | 8/1976 | Meyer et al. |
| 3,989,209 A | | 11/1976 | Feintuch et al. |
| 3,994,455 A | | 11/1976 | Simpson |
| 3,998,412 A * | | 12/1976 | Baker et al. .................. 244/189 |
| 4,006,871 A | | 2/1977 | Simpson |
| 4,141,522 A | | 2/1979 | Lambregts |
| 4,164,340 A | | 8/1979 | Simpson |
| 4,377,848 A | | 3/1983 | Flannigan et al. |
| 4,801,110 A | | 1/1989 | Skutecki |
| 5,414,631 A * | | 5/1995 | Denoize et al. ............. 701/301 |
| 5,739,770 A | | 4/1998 | Liden |
| 5,826,834 A * | | 10/1998 | Potter et al. .................. 244/195 |
| 5,951,608 A | | 9/1999 | Osder |
| 6,047,925 A | | 4/2000 | Rivera et al. |
| 6,575,410 B2 | | 6/2003 | Greene |
| 6,833,797 B2 | | 12/2004 | Ishihara |
| 6,879,886 B2 | | 4/2005 | Wilkins, Jr. et al. |
| 6,885,313 B2 | | 4/2005 | Selk, II et al. |
| 6,885,917 B2 | | 4/2005 | Osder et al. |
| 6,889,124 B2 | | 5/2005 | Block et al. |
| 2005/0261809 A1 * | | 11/2005 | Artini ............................ 701/3 |
| 2005/0261811 A1 | | 11/2005 | Artini et al. |

FOREIGN PATENT DOCUMENTS

GB  1167567  10/1969

OTHER PUBLICATIONS

European search report for GB Application No. GB0610444.2 dated Sep. 22, 2006.

* cited by examiner

*Primary Examiner*—Mark Hellner
*Assistant Examiner*—Helal A Algahaim
(74) *Attorney, Agent, or Firm*—Harness, Dickey & Pierce, P.L.C.

(57) ABSTRACT

An approach guidance method for an airborne mobile platform, for example an aircraft, and associated system. The method includes determining a radius of a capture arc tangential to a glide slope, determining an altitude for tangentially intercepting the capture arc, and guiding the mobile platform to an intercept point on the capture arc. The glide slope is associated with a waypoint, and the radius of the capture arc depends on variable mobile platform speed. The altitude for intercepting the capture arc depends on the radius of the capture arc and on variable flight angle.

21 Claims, 9 Drawing Sheets

TABLE 1- SELECTED TERMINOLOGY

| TERM | DESCRIPTION |
| --- | --- |
| RP | RANGE PARALLEL: CURRENT AIRCRAFT DISTANCE FROM THE WAYPOINT PARALLEL TO THE COURSE LINE |
| YGSC | ALTITUDE GATE: VERTICAL DISTANCE RELATIVE TO THE GLIDE SLOPE AT WHICH TRANSITION ONTO THE GLIDE SLOPE INITIATES |
| YGS | VERTICAL DISTANCE RELATIVE TO THE GLIDE SLOPE |
| RPZ | ALTITUDE GATE RANGE PARALLEL: THE RANGE FROM THE WAYPOINT ALONG THE APPROACH COURSE AT WHICH THE AIRCRAFT CAN DESCEND TO THE FINAL APPROACH ALTITUDE FROM THE CURRENT ALTITUDE AND FLIGHT PATH ANGLE |
| RPgs | RANGE AT WHICH THE GLIDE SLOPE INTERCEPTS THE FINAL ALTITUDE PLANE |
| RPC | RANGE FROM THE WAYPOINT TO THE ORIGIN (POINT C) OF THE CAPTURE ARC (TRANSITION ONTO GLIDE SLOPE ARC) |
| RPFH | RANGE AT WHICH TO EXIT THE GLIDE SLOPE TO ACHIEVE THE FINAL ALTITUDE |
| XCE | DISTANCE PAST RPC AT WHICH THE CAPTURE ARC INTERCEPTS THE GLIDE SLOPE AT POINT E |
| ZDOTLEAD | COMMANDED VERTICAL VELOCITY |

APPROACH GUIDANCE SYSTEM AND METHOD FOR AIRBORNE MOBILE PLATFORM

FEDERALLY SPONSORED RESEARCH

This invention was made with support by the United States Government under contract N00019-04-G-0007. The United States Government has certain rights in the invention.

TECHNICAL FIELD

The present teachings relate generally to guidance systems and methods used for assisting in landing/approach operations of a mobile platform, and more particularly to an approach guidance system and method for use with an airborne mobile platform.

INTRODUCTION

Various aircrafts used in commercial and military aviation have a requirement for an automatic approach to a crew selected location (waypoint) with a final ground speed and final altitude above ground level. Aircraft flight directors and other automatic systems may include software that activates an "approach to hover" mode designed to guide the aircraft to descend and decelerate to the waypoint with the crew-selected parameters of speed and altitude. Some currently available software may occasionally overshoot the targeted transition onto a glide slope that leads the aircraft to the waypoint, causing disengagement from a corresponding autopilot mode.

Although the existing guidance software can be satisfactory for its intended purpose, there is still a need for guidance systems and associated methods that provide improved reliability and functionality for approach to hover guidance.

SUMMARY

The present teachings provide an approach guidance method for an airborne mobile platform, for example an aircraft. The method includes determining a radius of a capture arc tangential to a glide slope, determining an altitude for tangentially intercepting the capture arc, and guiding the aircraft to an intercept point on the capture arc. The glide slope is associated with a waypoint, and the radius of the capture arc depends on variable aircraft speed. The altitude for intercepting the capture arc depends on the radius of the capture arc and on variable flight angle.

The present teachings also provide an approach guidance system for an airborne mobile platform. The system includes a guidance control module operable to determine a radius of capture arc tangential to a glide slope, wherein the glide slope is associated with a waypoint, and the radius depends on variable aircraft speed. The guidance control module is also operable to determine an altitude for tangentially intercepting the capture arc, wherein the altitude depends on the radius of the capture arc and on variable flight angle.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 12 is a table describing selected terminology used herein.

DETAILED DESCRIPTION

The following description is merely exemplary in nature and is in no way intended to limit the invention, its application, or uses. It will be understood that the characterizations of various quantities and orientations as, for example, "vertical", "horizontal", "above" and "below" are relative characterizations only based upon the particular position or orientation of a given quantity for a particular application. A list of selected terms used herein and their description is provided in Table 1 of FIG. 12 for ease of reference.

Figure 1:
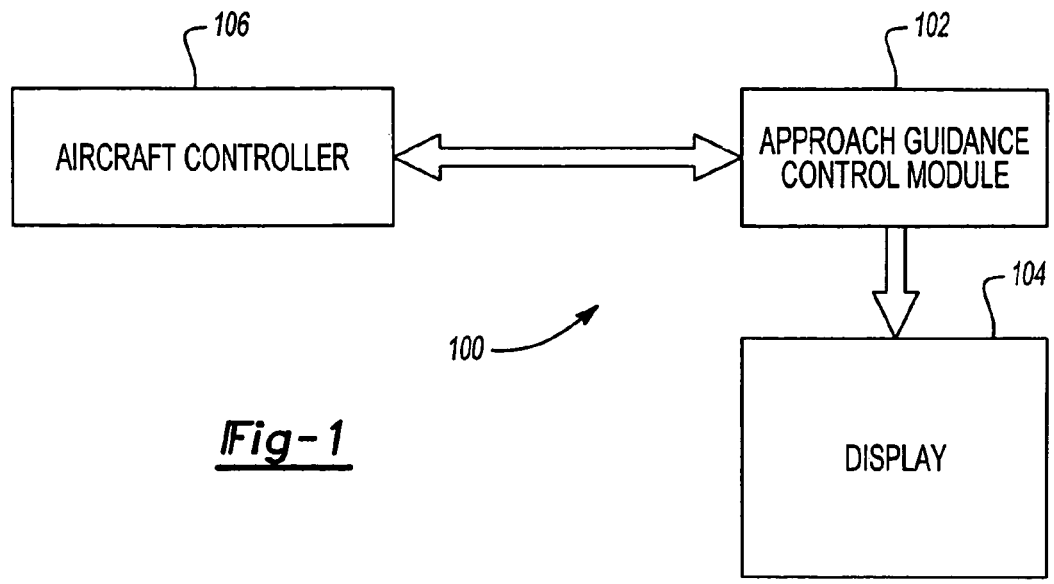
FIG. 1 is a diagrammatic representation of an approach guidance system according to the present teachings.

Referring to FIG. 1, an exemplary airborne mobile platform approach guidance system 100 is illustrated. In the following discussion an "aircraft" will be used for discussion purposes, although it will be appreciated that the present teachings can be applied to any airborne mobile platform. The approach guidance system 100 according to the present teachings can include an approach guidance control module 102 that can communicate with a pilot screen display 104, and with other aircraft instrumentation and controls generally referred to and designated as "aircraft controller 106". The guidance control module 102 can be a separate module or can be integral with the aircraft controller 106. The aircraft controller 106 can include standard/known aircraft control equipment, such as, for example, manual and/or automatic control instrumentation, GPS and radar systems and instrumentation, flight director instrumentation and software, including automatic flight director control systems, various control and other software modules, computer processors, microprocessors, or programmable logic controllers, data input devices, various communication devices, data collecting devices and sensors, and other known aircraft operating hardware and software components.

Figure 2:
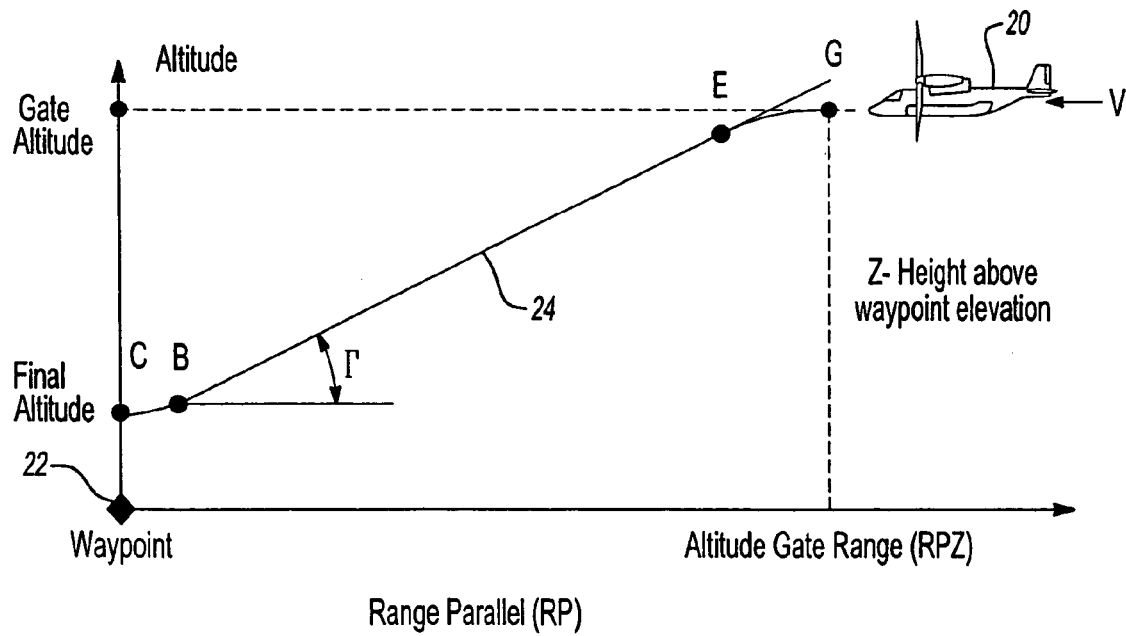
FIG. 2 is a diagrammatic representation of glide slope guidance according to the present teachings.

Referring to FIG. 2, the approach guidance control module 102 can be operable to guide an aircraft 20 to a waypoint 22, using manually, and/or automatically and/or semi-automatically provided inputs and data, and executing various automatic/programmed and/or manual/semi-automatic or pilot-controlled operations, as described below. The aircraft 20 can be any commercial, military or private aircraft, including, but not limited to, fixed wing and turboprop aircraft, helicopters and other rotary wing aircraft, and tilt rotor aircraft, such as the Osprey, for example, or possibly even to an unmanned air vehicle (UAV).

With continued reference to the exemplary illustration of FIG. 2, an exemplary approach maneuver, such as approach to hover maneuver, to a final altitude at a final speed to a selected waypoint 22, is illustrated according to the present teachings. At the initiation of the approach maneuver, the aircraft 20 can travel with current velocity "v" at an altitude "Z" above the specified waypoint 22, and at a range parallel distance "RPZ" from the waypoint 22. It will be appreciated that the current velocity v can be variable in time, such that the direction and magnitude of the velocity v can change in time. As illustrated, the aircraft 20 can be scheduled to approach and reach a final altitude at a point C above the waypoint 22. The aircraft 20 can be controlled by the guidance system 100 to start transitioning to a glide slope 24 at a point G, capture the glide slope 24 at a point E, track the glide slope 24 from point E to a point B, and flare out of the glide slope 24 from point B to the final altitude at point C. The glide slope 24 is a line or plane of constant slope, defined by a constant angle Γ, such as a four-degree angle, or other angle, relative to the horizontal or other reference line or surface. Depending on the application, the aircraft position relative to the glide slope 24 can be determined by interpreting sensed/received signals from terrestrial transmitters, such as an Instrument Landing System, or extraterrestrial systems, such as a Global Positioning Satellite. Alternatively, the aircraft position relative to the glide slope 24 can be determined by the aircraft controller 106 by known procedures.

Figure 3A:
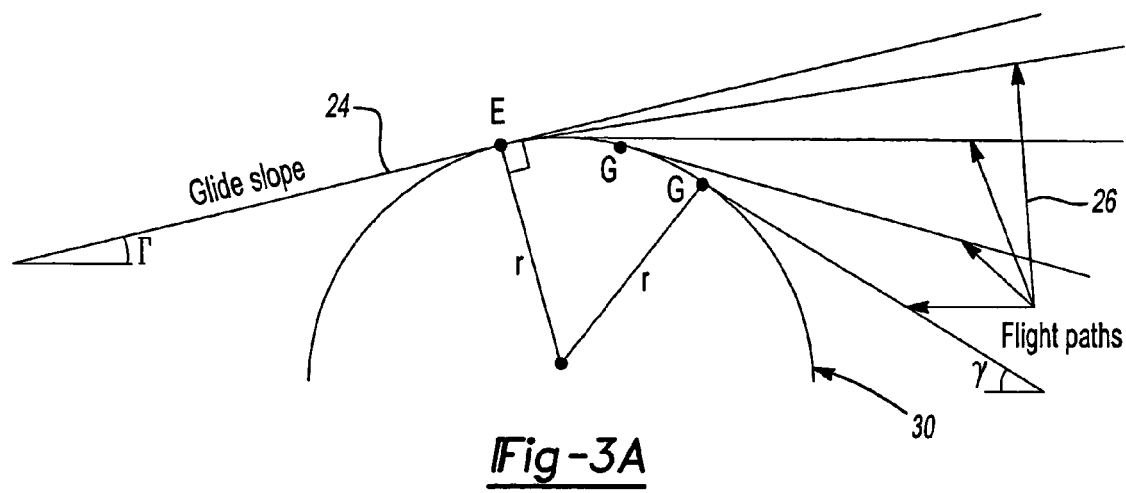
FIG. 3A is a geometric representation of guidance transition to glide slope from below according to the present teachings.
Figure 3B:
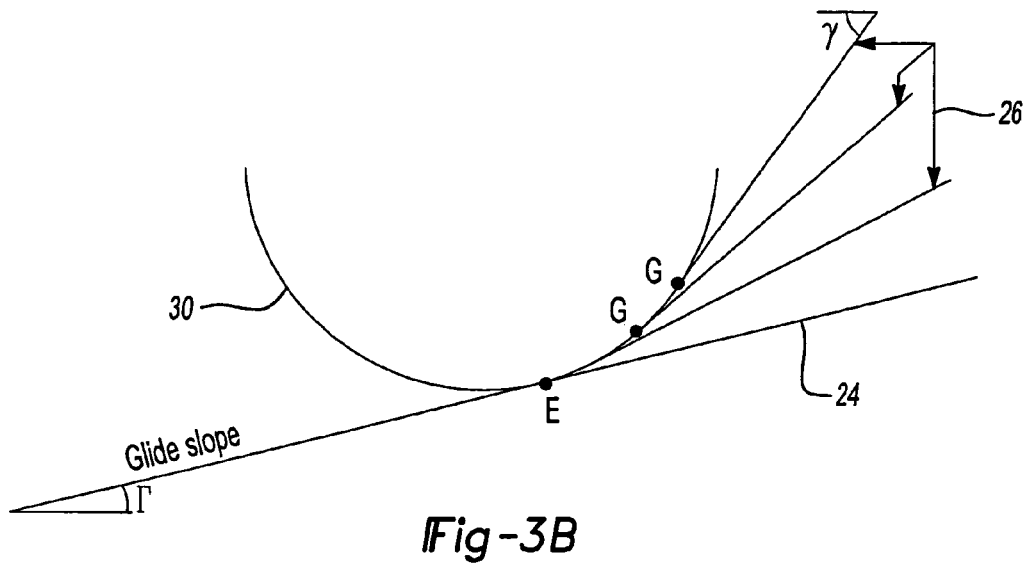
FIG. 3B is a geometric representation of guidance transition to glide slope from above according to the present teachings.

The transitioning to the glide slope 24 at G can be achieved while climbing or descending from a flight path 26 that is below the glide slope 24, as illustrated in FIG. 3A, or above the glide slope 24, as illustrated in FIG. 3B. Because the procedures for below- and above-transitioning to glide slope 24 are similar according to the present teachings, only the below-transitioning of FIG. 3A will be described in further detail. In a particular application, it may be desirable to incapacitate one of the transition approaches to the glide slope 24 in favor of the other, for simplicity reasons, for example. It will be understood, however, that the present teachings are not limited to only one transition, from above or from below. Transition from both below and above or selectively from below and/or above the glide slope 24 can be implemented in the guidance system 100, and can be available or not, as desired for a particular application.

Referring to FIG. 3A, for example, the transition onto the glide slope 24 according to the present teachings directs the aircraft 20 onto a capture arc 30 at the point G, and maintains the aircraft 20 on the capture arc 30 until the aircraft 20 is on the glide slope 24 at the point E. The capture arc 30 is tangential to the glide slope 24 at the point E. Accordingly, the transitioning of the aircraft 20 to the glide slope 24 follows the segment of the capture arc 30 between points G and E. More specifically, the point G is the point at which the flight path 26 of the aircraft 20 tangentially intercepts the capture arc 30, and the point E is the point at which the capture arc 30 tangentially intercepts the glide slope 24. Accordingly, transition to glide slope 24 includes following the capture arc 30 from point G to point E.

Figure 4:
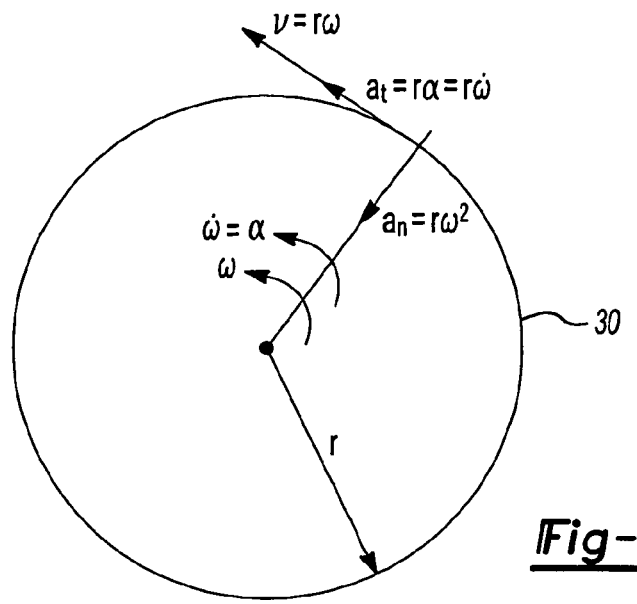
FIG. 4 is a diagrammatic representation of a determination of a radius of a capture arc according to the present teachings.
Figure 5:
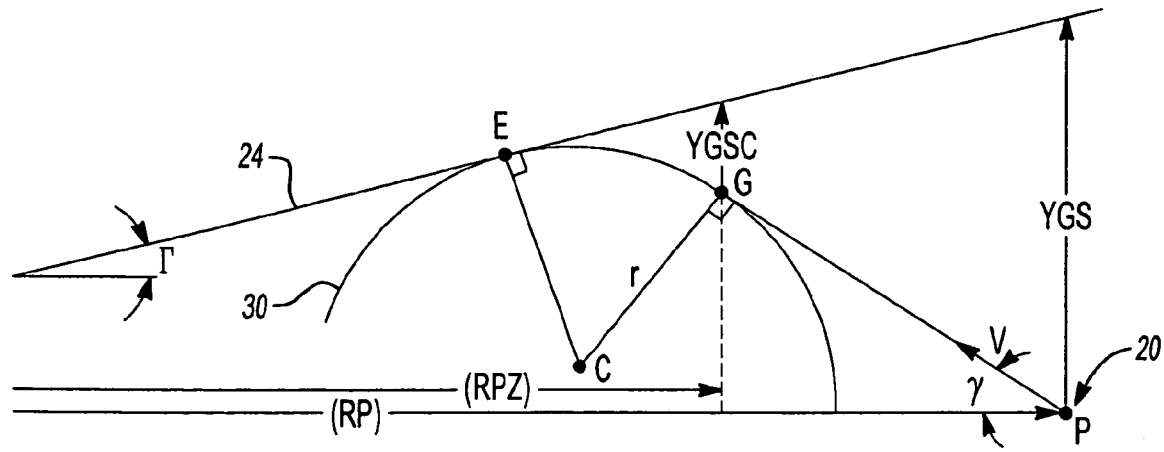
FIG. 5 is a diagrammatic representation of capture arc and glide slope intercepts according to the present teachings.

Referring to FIGS. 4 and 5, the radius of curvature "r" of the capture arc 30 is a function of the current (instantaneous) aircraft speed v, and can be determined to provide smooth transition to the glide slope 24 from any reasonable flight angle "γ" and speed v of the aircraft 20. The radius r can be determined by the following equation:

$$r = \frac{v^2}{a_n} \quad \text{Equation 1}$$

The derivation of Equation 1 is illustrated in FIG. 4, wherein $a_n$ is a pushover linear acceleration orthogonal to the capture arc 30. Conventional terminology is used for tangential linear acceleration $a_t$, angular acceleration α, and angular velocity ω. The pushover normal acceleration $a_n$ can have a conventionally selected value, such as, for example, 0.05 g, wherein g is the gravitational acceleration. It will be appreciated, however, that other values for the pushover acceleration $a_n$ can also be selected, depending on the particular application.

Figure 6:
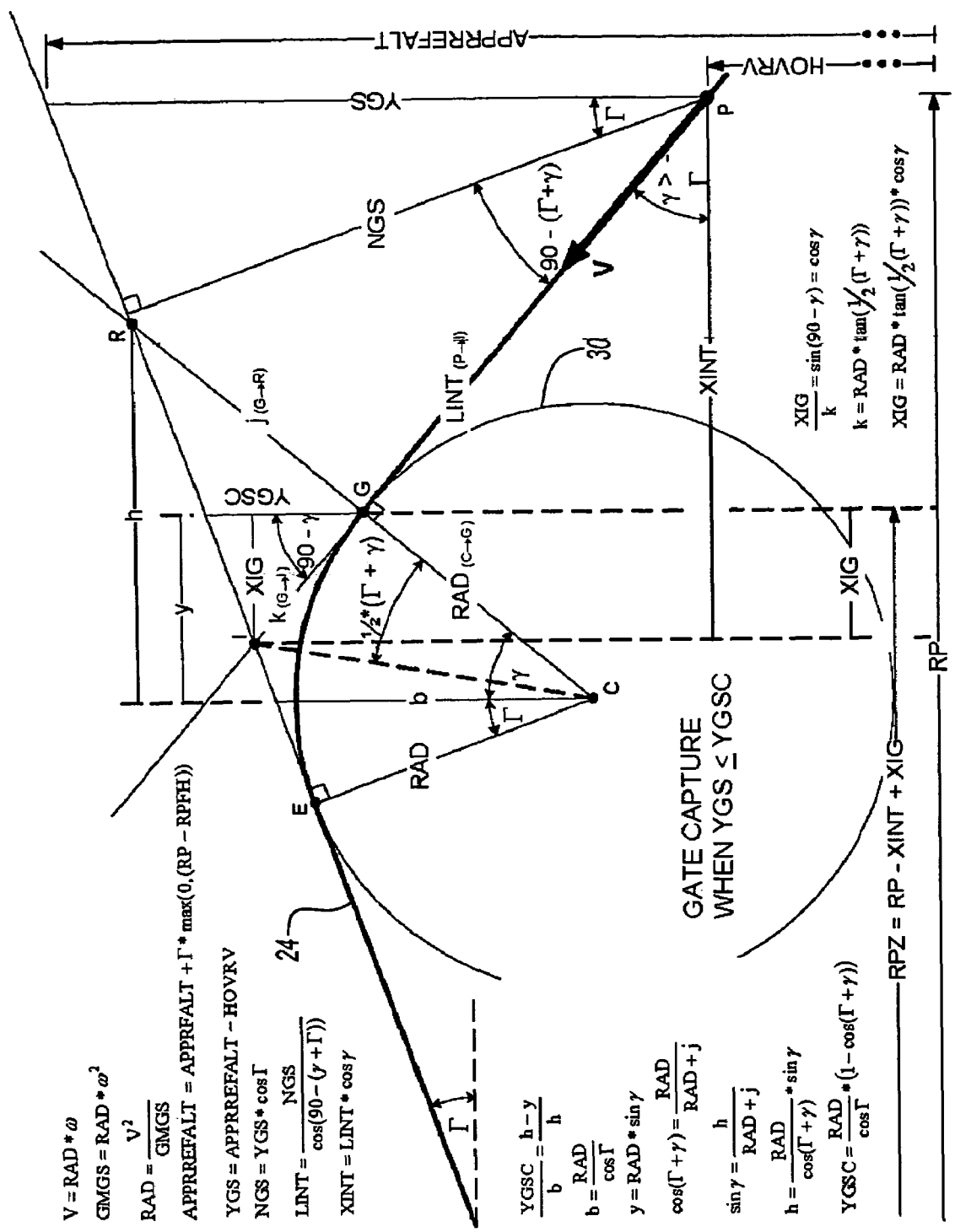
FIG. 6 is a diagrammatic representation of the determination of capture arc intercept and associated geometric properties according to the present teachings.

Referring to FIGS. 5 and 6, when the aircraft 20 is within a vertical distance YGSC, also known as altitude gate, from the glide slope 24, vertical guidance of the aircraft 20 can be activated, such that the aircraft 20 can be directed to follow the capture arc 30. As illustrated in FIG. 5, the horizontal distance or range parallel RPZ that corresponds to the location of the altitude gate YGSC is the range that corresponds to the point G, at which the aircraft 20 intercepts the capture arc 30. The vertical distance between the aircraft 20 and the glide slope 24 is designated as YGS. When YGS is less than or equal to YGSC, vertical guidance can be activated to cause the aircraft 20 to follow the capture arc 30. The determination of the vertical distance YGSC can be derived from the geometric calculations indicated in FIG. 6, and can be expressed as follows:

$$YGSC = \frac{r}{\cos \Gamma} + (1 - \cos(\Gamma + \gamma)) \quad \text{Equation 2}$$

Figure 7:
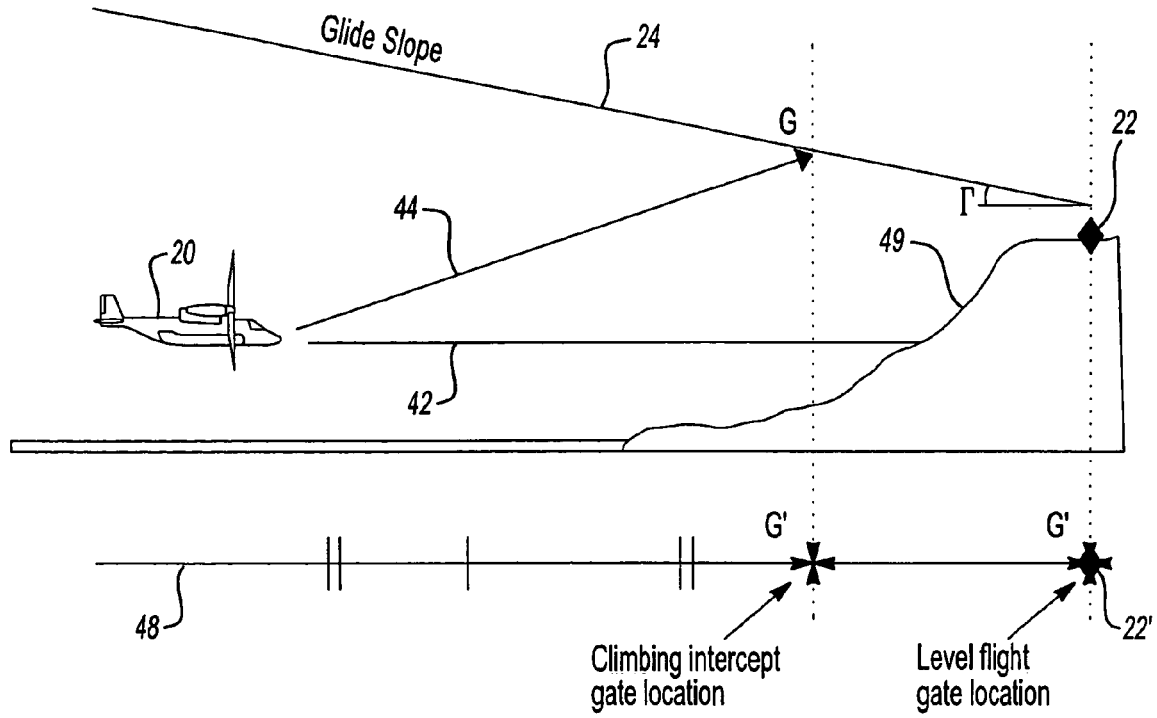
FIG. 7 is a diagrammatic representation of flight paths and associated graphical representations of the flight course according to the present teachings.

The altitude gate YGSC is "dynamic" because it depends on the current speed v and current flight path angle γ. Changes in speed v and flight path angle γ have a significant effect on the range at which the aircraft 20 will intercept the glide slope 24. The expected location of the intercept point G can be graphically displayed relative to a graphical flight course/path 48 on a pilot screen display 104 using a symbology illustrated at the lower portion of FIG. 7, below a diagrammatic representation of exemplary first and second flight paths 42, 44. When the aircraft 20 is below the waypoint elevation and at level flight along the first flight path 42, such that the glide slope 24 will not be intercepted, an altitude gate symbol G' corresponding to the arc intercept point G, can be displayed on top the symbol 22' that corresponds to the waypoint 22. In the exemplary illustration of FIG. 7, the symbol 22' for the waypoint 22 is a rhombus, and the altitude gate symbol G' for the intercept point G is a Maltese cross. When the aircraft 20 is at the second climbing path 44 that will intercept the glide slope 24, the altitude gate symbol G' will move off the waypoint symbol 22', and will be displayed on the graphical flight path 48 at the range where vertical guidance can be activated for following the capture arc 30. Similarly, when the aircraft 20 is on a course that will intercept the ground/terrain 49 before intercepting the glide slope 24, or is on a course descending at an angle greater than $\Gamma$ such that the glide slope 24 will not be intercepted, the altitude gate symbol G' can be displayed on the waypoint symbol 22' to provide a visual warning and alert the pilot to change speed or flight path by manual control. In these situations, the calculated range parallel RPZ corresponding to the intercept point G has a zero or negative value.

The described symbology can be dynamically implemented because the position of the intercept point G (range parallel and altitude coordinates) at any current speed v and flight angle γ of the aircraft 20 can be determined as described above.

Figure 8:
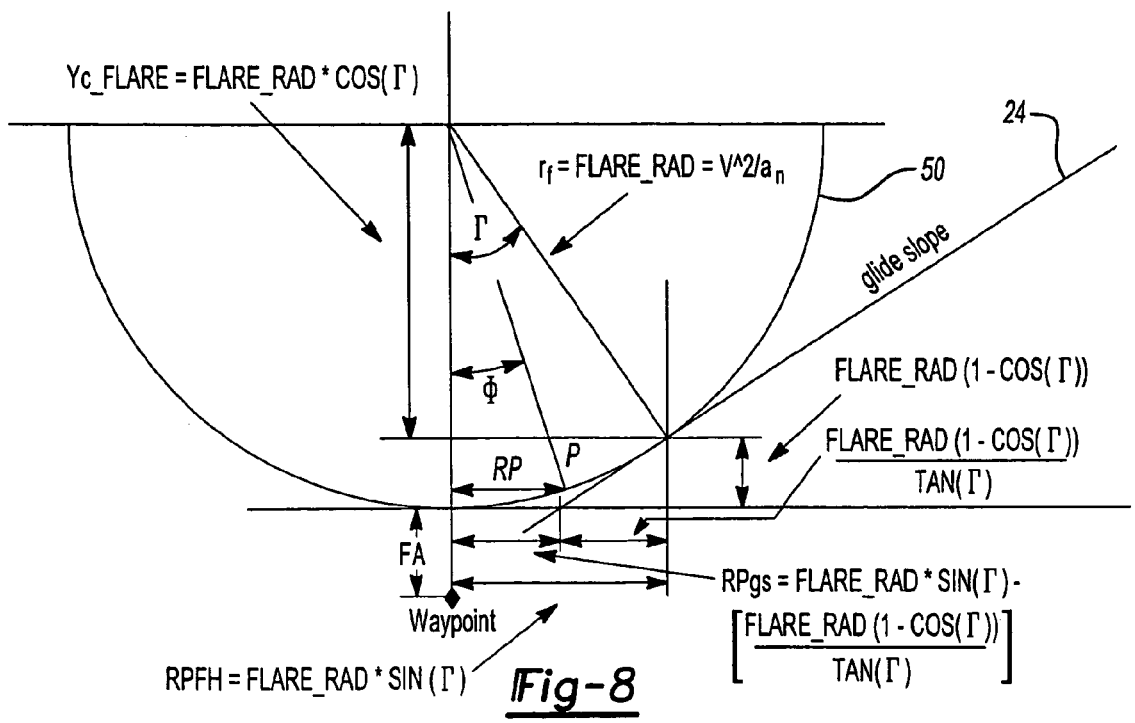
FIG. 8 is a diagrammatic representation of a determination of a radius of a flare arc and associated geometric properties according to the present teachings.

Referring to FIGS. 2 and 8, the transition off the glide slope 24 at point B for reaching the final altitude at C can be effected using similar principles as those described for the transition onto the glide slope 24 discussed above. The transition off the glide slope 24 can follow a flare arc 50 that has a constant radius $r_f$ (FLARE_RAD in FIG. 8) which can be calculated from Equation 1 using a conventionally selected normal acceleration $a_n$ for pull up, such as 0.1 g, for example, and a selected final speed, such as 50 knots, for example. With these exemplary values, the radius $r_f$ of the flare arc 50 is determined to be about 2213.5 feet. It will be appreciated that other values for the pull up acceleration an and/or the final speed can be selected for calculating the radius of the flare arc 50.

Referring to the geometry of FIG. 8, the range parallel RPFH at which the glide slope 24 transitions to the flare arc 50 can be calculated from $r_f$ using the following equation:

$$RPFH = r_f \times \sin \Gamma \quad \text{Equation 3}$$

For the example in which glide slope angle $\Gamma$ is equal to 4 degrees and the value of $r_f$ is calculated as described above, the exemplary value for RPFH can be determined to be about 154.4 feet. The range parallel at which the glide slope 24 intercepts the final altitude plane provides a range parallel offset $RP_{gs}$ from the waypoint 22, and can be calculated by the following equation:

$$RP_{gs} = RPFH - \frac{r_f(1-\cos\Gamma)}{\tan\Gamma} \quad \text{Equation 4}$$

For the example above, $RP_{gs}$ is determined to be about 77.3 feet.

The desired altitude "DA" at a point P on the flare arc 50 at a range parallel "RP" can be determined for flare arc maintenance from the geometry of FIG. 8 as follows:

$$DA = FA + r_f - \sqrt{(r_f^2 - (RP)^2)}, \quad \text{Equation 5, wherein FA is the final altitude.}$$

The desired vertical component "ZDOTLEAD" of the velocity "VEL" at the point P for flare arc maintenance can be determined from the following equation:

$$ZDOTLEAD = -VEL \sin \varphi \quad \text{Equation 6, wherein:}$$

$$\tan\varphi = \frac{RP}{\sqrt{(r_f^2 - (RP)^2)}} \quad \text{Equation 7}$$

Figure 9:
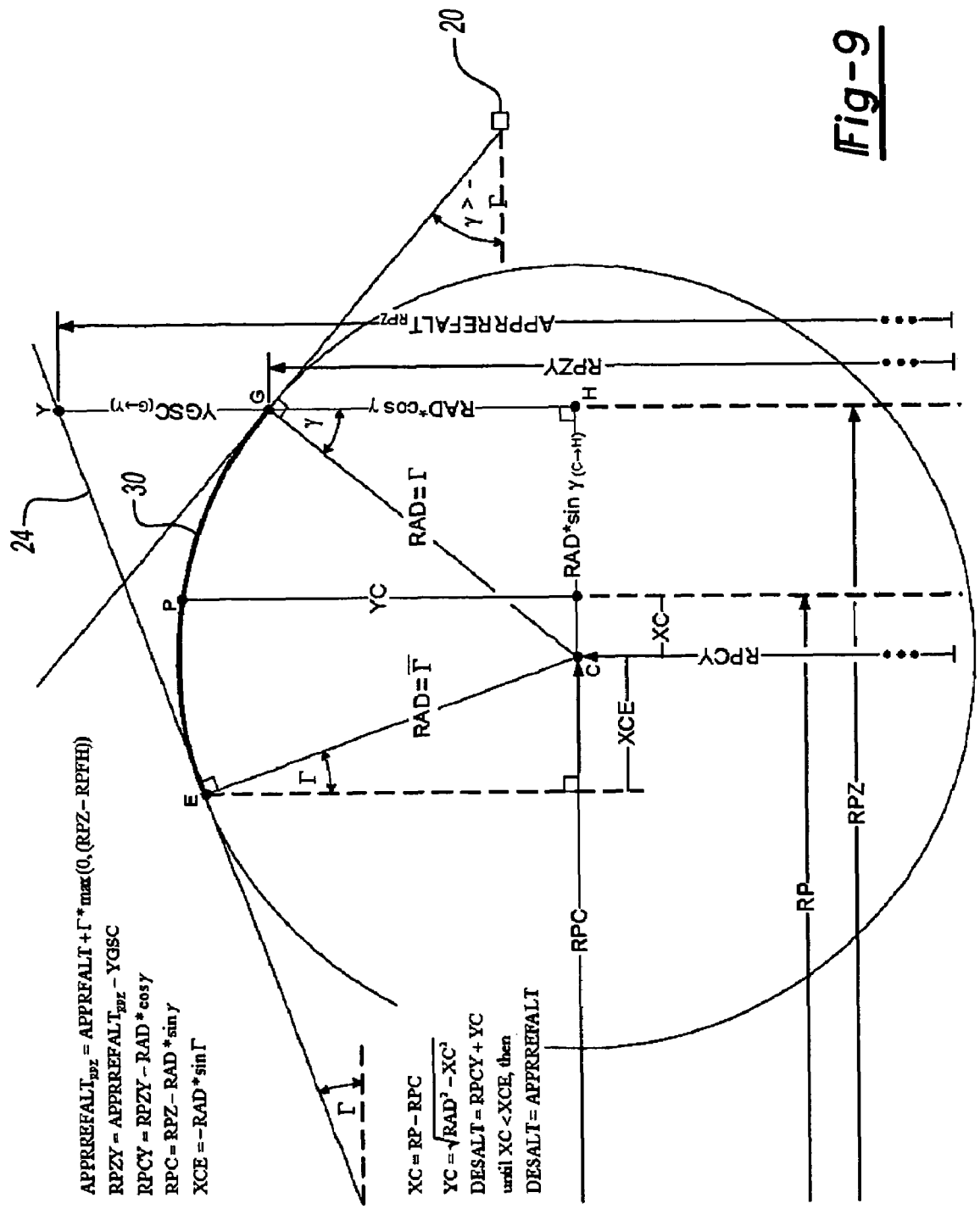
FIG. 9 a diagrammatic representation of a determination of a aircraft coordinates along a capture arc according to the present teachings.

Referring to FIG. 9, when the aircraft 20 reaches the capture arc intercept point G (altitude gate capture) on the capture arc 30, vertical guidance can be activated to guide the aircraft 20 onto the glide slope 24 along the capture arc 30. The capture arc 30 can be described by an equation as a function of Cartesian coordinates XC, YC for a point P along the capture arc 30 between the capture arc intercept point G and the glide slope intercept point E. When the capture arc 30 is an arc of a circle, for example, the Cartesian coordinates XC, YC are measured relative to a coordinate system at the center of curvature C of the circle. In such case, the radius of curvature r of the capture arc 30 can be related to the coordinates XC and YC by the following equation:

$$r^2 = (XC)^2 + (YC)^2 \quad \text{Equation 8}$$

The horizontal coordinate XC can be determined as the difference between the range parallel RP of the point P and the range parallel RPC of the center C of the capture arc 30. The radius r can be determined from Equation 1 as a function of speed v, as described above. Having thus determined XC and r, YC can be determined from Equation 8. The aircraft 20 can be guided along the capture arc 30 between points G and E by directing the aircraft 20 to a vertical altitude corresponding to the vertical coordinate YC, as long as XC is less than a horizontal distance XCE that corresponds to the glide slope intercept point E. As can be determined from FIG. 9, XCE can be calculated from the following equation:

$$XCE = -r \times \sin \Gamma \quad \text{Equation 9}$$

Figure 10:
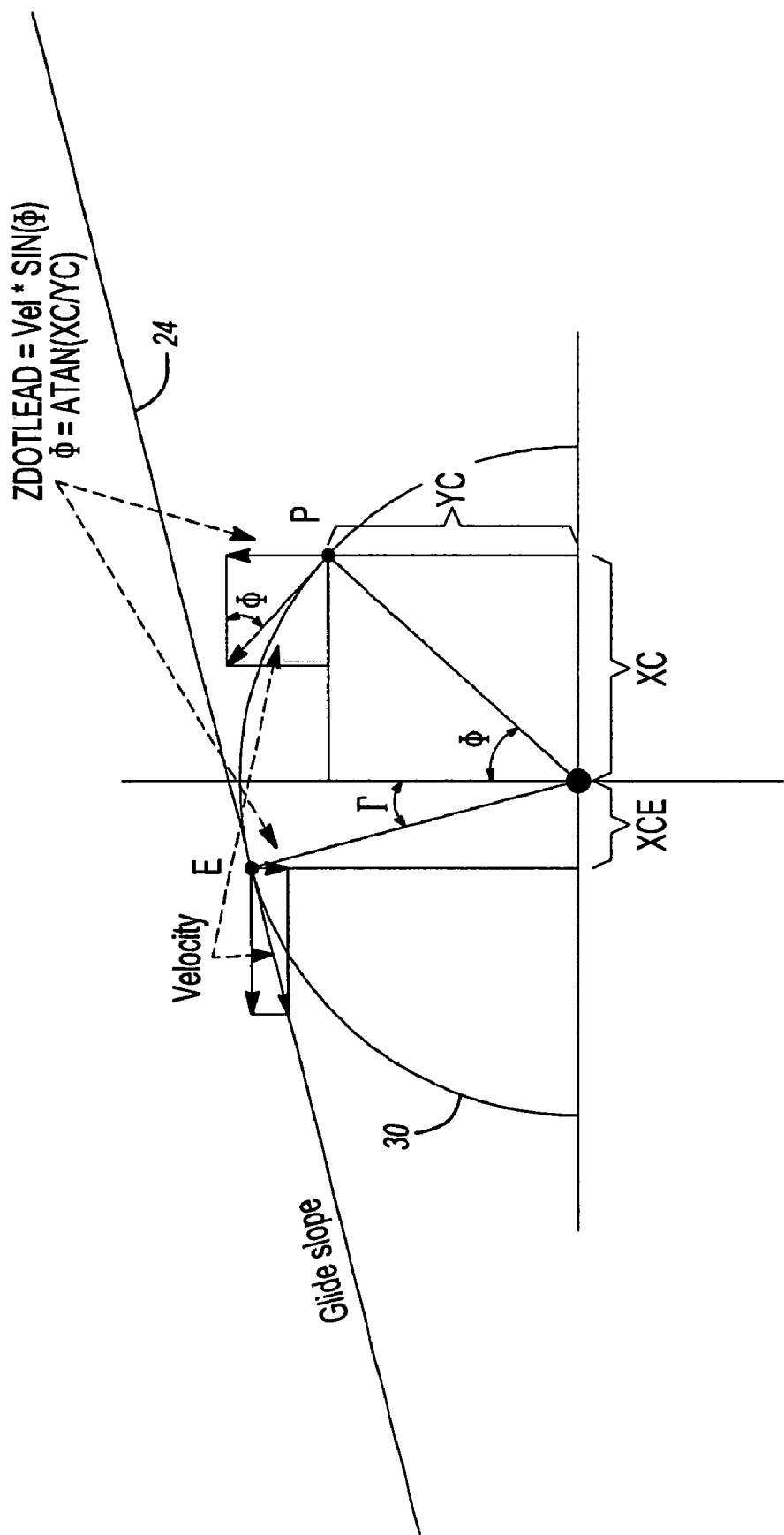
FIG. 10 is a diagrammatic representation of a determination of a vertical velocity on the capture arc and on the glide slope transition according to the present teachings.

For a smooth transition onto the glide slope 24, a desired rate of climb may be required. Referring to FIG. 10, the rate of climb can be defined by the vertical component ZDOTLEAD of the velocity VEL, which is tangential to the capture arc 30 at any position P of the aircraft 20 on the capture arc 30 and can be calculated as shown in FIG. 10.

At point E, the aircraft 20 intercepts the glide slope 24. Referring to FIGS. 8 and 9, the desired altitude Z while on the glide slope 24 can be determined from the following equation:

$$Z = FA + \sin \Gamma (RP - RP_{gs})$$

Equation 10, wherein "FA" is the final altitude at which the glide slope 24 starts.

The vertical component ZDOTLEAD of the velocity VEL for maintenance on the glide slope 24 can be determined from Equation 6 above by setting φ equal to the glide slope angle $\Gamma$.

As can be seen from Equation 10, the desired altitude profile for glide slope maintenance, as determined by Z, is a function of the range parallel RP, and is vertically aligned above the waypoint 22, such that when RP is zero the desired altitude is equal to the final altitude above ground (AGL). Aircraft altitude can be controlled by any known means, such as, by air data and/or inertial sensors, rather than by the radar altimeter which will fluctuate with terrain, although the radar altimeter can also be used.

Figure 11:
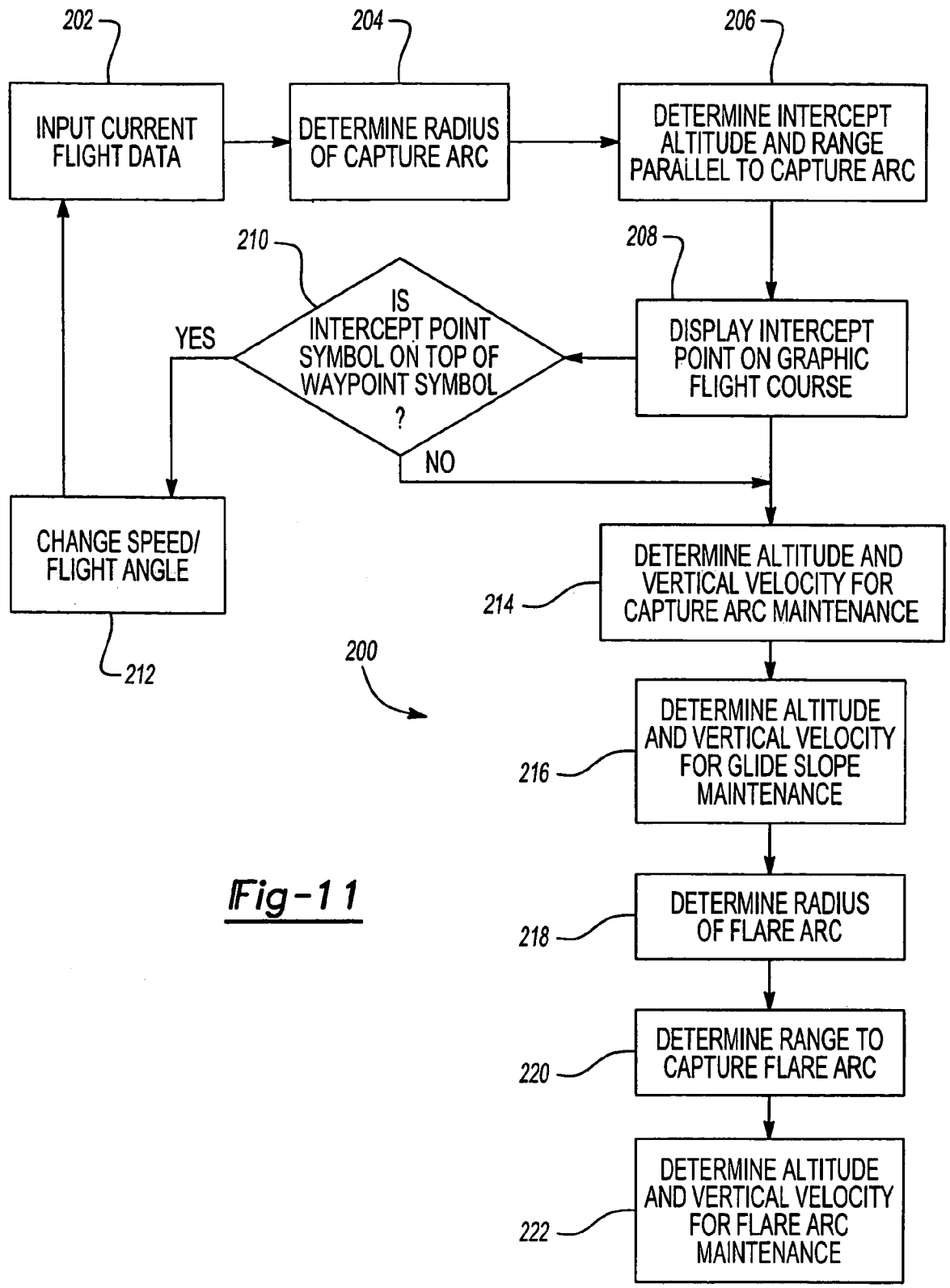
FIG. 11 is a flowchart of an approach guidance method according to the present teachings.

An exemplary implementation of the guidance system 100 is provided in the operations of an approach to guidance method 200, as described above with reference to FIGS. 2-10. The exemplary illustration of FIG. 11 outlines some selected operations of the method 200. The method 200 can include, for example, at operation 202, inputting current flight data, such as speed, flight angle, and waypoint parameters, if not already specified. From the provided input data, the radius r of the capture arc 30 can be determined, at operation 204. The altitude gate YGSC and the corresponding range parallel RPZ to the intercept point G of the capture arc 30 can be determined at operation 206. The intercept point G can be displayed graphically on the graphic flight course 48 by the symbol G', at operation 208. The pilot can determine whether the symbol G' for the intercept point G is on top of the waypoint symbol 22' on the graphic display. If the answer is yes, the pilot can change the current speed and/or flight angle at operation 212, and input the new data at operation 202. If the answer is no, the altitude and vertical velocity for capture arc maintenance can be determined at operation 214. The altitude and vertical velocity for glide slope maintenance can be determined at operation 216. The radius of the flare arc 50 can be determined at operation 218. The range parallel to capture the flare arc 50 can be determined at operation 220. The altitude and vertical velocity for flare arc maintenance can be determined at operation 222. It will be understood, that the query at operation 210 and associated response action can be automated using the determined value of RPZ, as described above. Similarly, at operation 214, a query to determine whether the aircraft position is still between points G and E on the capture arc 30, can be incorporated. It will also be appreciated that other queries, refinements and calculations, as detailed in FIGS. 1-10, can be included.

It will be appreciated from the above description that the guidance system 100 and method 200 of the present teachings provide smooth transition onto and off the glide slope 24, and can avoid glide slope overshoot. The guidance system 100 and method 200 can calculate the distance to capture arc and glide slope intercept points G and E, and provide visual reference to the pilot to indicate whether the aircraft 20 will intercept the glide slope 24 at the current flight path angle γ. Further, the guidance system 100 can provide transition to the glide slope 24 from below and/or above the glide slope 24.

It will be appreciated that automatic flight correction can be optionally implemented to follow a desired altitude, and the aircraft 20 can be automatically directed by the guidance system 100 to follow the capture arc 30, the glide slope 24 and the flare arc 50 to the waypoint 22 without intervening pilot action.

The foregoing discussion discloses and describes merely exemplary arrangements and aspects of the present teachings. One skilled in the art will readily recognize from such discussion, and from the accompanying drawings and claims, that various changes, modifications and variations can be made therein without departing from the spirit and scope of the invention as defined in the following claims.

What is claimed is:

1. An approach guidance method for an airborne mobile platform having an approach guidance system, the guidance system including a platform controller and an approach guidance control module, the method comprising:
   based on a current speed and a current flight angle of the platform:
      determining a radius of a substantially vertical capture arc tangential to a glide slope, the guide slope associated with a waypoint, and
      determining whether an altitude gate between the capture arc and a projection of the glide slope is accessible by the platform to approach the capture arc; and
   based on the determining, commencing vertical guidance of the platform as it enters the altitude gate and guiding the platform from the altitude gate to and at least partly along the capture arc to the guide slope;
   the method performed by the approach guidance system of the platform.

2. The method of claim 1, further comprising:
   calculating a vertical velocity for following the capture arc onto the glide slope.

3. The method of claim 1, further comprising performing at least the determining steps using a changed speed and/or a changed flight angle of the platform.

4. The method of claim 1, wherein determining the radius of the capture arc comprises selecting for the platform a pushover normal acceleration orthogonal to the capture arc.

5. The method of claim 1, further comprising:
   determining the radius of a flare arc for guiding the mobile platform off the glide slope, the flare arc radius being determined based on a selected final speed over the waypoint and a selected final altitude above the waypoint.

6. The method of claim 1, further comprising, based on whether an altitude gate is determined to be accessible, displaying the altitude gate before the altitude gate is entered by the platform.

7. The method of claim 1, further comprising representing a location of an expected intercept point on the capture arc on a pilot flight path display.

8. The method of claim 7, wherein representing the intercept point comprises indicating whether the mobile platform can reach the intercept point on a current flight path.

9. The method of claim 7, wherein representing the intercept point comprises dynamically representing the intercept point on the current flight path.

10. The method of claim 1, further comprising intercepting the glide slope along a flight path above the glide slope, or below the glide slope, or either above or below the glide slope.

11. An approach guidance system for an airborne mobile platform, the system comprising a platform controller and a guidance control module configured to:
   using a current speed and a current flight angle of the platform,
      determine a radius of a substantially vertical capture arc tangential to a glide slope, the guide slope associated with a waypoint, and
      determine whether an altitude gate between the capture arc and a projection of the glide slope is accessible by the platform to approach the capture arc; and
   based on the determining, commence vertical guidance of the platform as it enters the altitude gate and guide the platform from the altitude gate to and at least partly along the capture arc to the guide slope.

12. The system of claim 11, wherein the platform controller and guidance module are further configured to guide the mobile platform to an intercept point on the capture arc.

13. The system of claim 12, wherein the platform controller and guidance module are further configured to determine a vertical velocity for following the capture arc onto the glide slope.

14. An aircraft comprising the system of claim 11.

15. The system of claim 11, wherein the platform controller and guidance module are further configured to select for the platform a pushover normal acceleration orthogonal to the capture arc and to determine the radius of the capture arc based on the pushover normal acceleration.

16. The system of claim 11, wherein the platform controller and guidance module are further configured to determine a radius of a flare arc for guiding the mobile platform off the glide slope, the flare arc radius determinable based on a selected final speed over the waypoint and a selected final altitude above the waypoint.

17. The system of claim 16, wherein the platform controller and guidance module are further configured to guide the mobile platform along the flare arc to the waypoint.

18. The system of claim 11, wherein the platform controller and guidance module are further configured to, based on whether an altitude gate is determined to be accessible, represent graphically on a pilot flight path display the altitude gate before the altitude gate is entered by the platform.

19. The system of claim 18, wherein the platform controller and guidance module are further configured to graphically indicate whether the mobile platform can reach an intercept point on the capture arc on a current flight path.

20. The system of claim 19, wherein the platform controller and guidance module are further configured to dynamically represent the intercept point on the current flight path.

21. The system of claim 12, wherein the platform controller and guidance module are configured to guide the mobile platform tangentially to the capture arc along a flight path above the glide slope, or below the glide slope, or either above or below the glide slope.

* * * * *